United States Patent
Huebsch et al.

(10) Patent No.: US 9,988,536 B2
(45) Date of Patent: Jun. 5, 2018

(54) COMPOSITIONS FOR SURFACE TREATMENTS

(71) Applicant: E I DU PONT DE NEMOURS AND COMPANY, Wilmington, DE (US)

(72) Inventors: Eric Huebsch, Contern (LU); Noel Stephen Brabbs, Garnich (LU)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 831 days.

(21) Appl. No.: 14/531,193

(22) Filed: Nov. 3, 2014

(65) Prior Publication Data

US 2015/0125695 A1 May 7, 2015

Related U.S. Application Data

(60) Provisional application No. 61/899,967, filed on Nov. 5, 2013.

(51) Int. Cl.
| | | |
|---|---|---|
| *C09D 4/00* | (2006.01) | |
| *D06M 15/277* | (2006.01) | |
| *C08F 220/24* | (2006.01) | |
| *C09D 133/14* | (2006.01) | |
| *C09D 133/16* | (2006.01) | |

(52) U.S. Cl.
CPC ............... *C09D 4/00* (2013.01); *C08F 220/24* (2013.01); *C09D 133/14* (2013.01); *D06M 15/277* (2013.01); *Y10T 428/2965* (2015.01); *Y10T 428/2967* (2015.01); *Y10T 428/2969* (2015.01)

(58) Field of Classification Search
CPC ..... C09D 4/00; C09D 133/14; D06M 15/277; C08F 220/24
USPC ............................ 526/243, 245, 246; 528/70
See application file for complete search history.

(56) References Cited

U.S. PATENT DOCUMENTS

| | | |
|---|---|---|
| 6,551,950 B1 | 4/2003 | Badyal et al. |
| 7,157,117 B2 | 1/2007 | Mikhael et al. |
| 8,193,277 B2 | 6/2012 | Otozawa et al. |
| 2005/0027063 A1* | 2/2005 | Audenaert et al. ... C08F 259/08 524/544 |
| 2005/0178330 A1 | 8/2005 | Goodwin et al. |
| 2008/0146734 A1 | 6/2008 | Youngblood et al. |

FOREIGN PATENT DOCUMENTS

| | | |
|---|---|---|
| WO | WO9605172 | 2/1996 |
| WO | WO0159809 | 8/2001 |
| WO | WO0228548 | 4/2002 |
| WO | WO2005110626 | 11/2005 |
| WO | WO2011037826 | 3/2011 |

OTHER PUBLICATIONS

Kaynak, et al, Polyester Microfilament Woven Fabrics, Woven Fabrics (Han-Yong Jeon, Ed.), ISBN: 978-953-51-0607-4, InTech, 155-178; published online: May 16, 2012.*

* cited by examiner

*Primary Examiner* — Fred M Teskin

(57) ABSTRACT

A composition having at least one first component containing a perfluorinated aliphatic structure in which no more than six fluorine bearing carbons are connected in any single straight chain segment, in addition a group providing binding functionality to a surface to be treated or containing at least one polymerisable double bond or containing at least one cross-linkable group, and in addition a divalent radical containing at least one group capable of forming polar interactions or hydrogen bonds, and at least one second component containing a perfluorinated aliphatic structure in which no more than six fluorine bearing carbons are connected in any single straight chain segment and a moiety containing at least one group providing binding functionality to a surface to be treated or containing at least one polymerisable double bond or containing at least one cross-linkable group.

5 Claims, No Drawings

COMPOSITIONS FOR SURFACE TREATMENTS

BACKGROUND

1. Field of the Invention

The present invention concerns a combination of compounds having perfluorinated alkyl chains suitable for use for the surface treatments of substrates.

2. Description of the Related Art

Compounds containing perfluorinated alkyl chains are well known to have low intermolecular forces and have been used effectively in surface treatment of materials to provide stain resistance, hydrophobicity, and oleophobicity especially where the surface energy of the treated surface should be less than about 30 mN/m.

Such perfluorinated alkyl chains are usually attached to functional groups which can bind to a surface to which they are applied, or else they may be attached to a polymerizable moiety to form a monomer which can be polymerized to form a polymer having perfluorinated side chains which can then be formulated into a coating for application to the surface to be treated. Alternatively, coatings containing such monomers may be applied to the surface and polymerized in situ.

The surface properties of fluorinated polymers such as poly(meth)acrylates depends on the pendant perfluoroalkyl groups. Polymers with short fluorinated chains are not able to form an ordered surface at ambient temperatures because of high thermal molecular mobility. Fluorinated polymers with longer perfluoroalkyl groups do form an ordered surface under ambient conditions and the resulting increased concentration of trifluoromethyl groups in the top layer provides high water and oil repellency. For these reasons fluorinated polymers with long perfluorinated side chains have been widely used for surface coatings.

U.S. Pat. No. 5,641,844 relates to polymers of acrylic or methacrylic acid esters that have pendant fluoroalkyl side groups which provide durable water and oil repellency to substrates coated with these polymers. The fluoroalkyl groups having the formula $-(CH_2)_m(CF_2)_nF$ with n=8, 10, 12, 14, etc enhance repellent performance thanks to the aligned fluoroalkyl side chains which are locked in a quasi-crystalline configuration, limiting their thermal mobility. Thus long, pendent chains of fluorinated carbons are required to significantly improve the repellency of materials coated with polymers of acrylic or methacrylic acid esters.

WO 96/05172 relates to acrylic monomers which contain urethane units and perfluorinated alkyl groups. The reference shows that, to provide optimum water and oil repellency, the pendant perfluorinated alkyl groups should be long chained and should be permanently aligned parallel to adjacent pendant groups attached to adjacent acrylic backbone units. In these polymers, the pendant perfluoroalkyl groups are modified by the presence of urethane groups between the acrylic backbone and the perfluorinated groups. The affinity of the urethane groups for one another apparently helps to keep the entire pendant chain substantially in a fixed alignment even when subjected to adverse conditions, such as heat. This aspect is generally referred to as a matrix effect, which produces alignment resulting in the apparent growth of the polymeric chain.

US 2008/0146734 provides improved oil-resistant and self-cleaning surfaces by coating with copolymers comprising common monomers such as acrylic acid, hydroxyethyl methacrylate and methyl methacrylate with fluorinated monomers having a long, fluorinated alkyl group linked to the acrylate group via a hydrophilic group.

However, due to concerns about the environmental persistence and bioaccumulative nature of compounds containing perfluorinated alkyl chains of seven or more carbon atoms, such as perfluorooctanoic acid (PFOA), regulations restricting the use of materials which can decompose or be metabolized to such molecules are becoming more strict. Thus, significant research is being undertaken into alternative chemistries, which rely on compounds containing shorter perfluorinated chains having six or fewer fluorine-bearing carbon atoms.

Compounds with a reduced perfluorinated chain length (fewer than seven fluorine-bearing carbon atoms) can provide a low surface energy if used in bulk materials or in relatively thick coatings (several μm thick). However when used in thin coatings, especially under one micrometer thickness, their performance in reducing surface tension is poor compared to monomers having perfluorinated chains of seven or more carbon atoms. This is especially the case in the presence of oils or greases. While a high degree of water repellency can be achieved using short chain perfluorinated molecules, oil repellency of such materials is poor in comparison with those based on longer chain perfluorinated molecules. Honda et al, in Macromolecules, 2005, 38, 13, 5699 teach that ordered structures form easily between parallel perfluoroalkyl chains of greater than eight carbons, while such pseudo-crystalline structures form to a much lesser extent between perfluoroalkyl chains having fewer than eight carbon atoms, and such pseudo-crystalline structures which do form between shorter perfluoroalkyl chains are easily disrupted. This could be interpreted as due to weaker hydrophobic interactions (Van der Waals forces) between shorter chains which are, therefore, unable to maintain an organized layer with well aligned perfluoroalkyl chains.

Oil and water repellency obtainable using coatings based on short-chain perfluoroalkyl molecules may be improved by engineering the properties such as the glass transition temperature and the molecular weight of copolymers of fluorinated and non-fluorinated acrylic monomers as described in, for example, U.S. Pat. No. 8,193,277. However, such copolymers are not usable in all circumstances.

The addition of polar functionalities, for example groups able to form hydrogen bonds, between a cross-linkable group and a short perfluoroalkyl chain has been observed to give improved performance in thin layers (Clegg and Hutchison et al, J. Am. Chem. Soc. 1999, 121, 5319-5327), possibly due to association between polar molecular segments forcing a stronger aggregation and order in the short, perfluoroalkyl chains. However, this still may not reach the high level of performance achievable using long-chain (seven or more carbon atoms) perfluoroalkyl derivatives.

Thus, it is desirable to develop more environmentally acceptable fluorinated compositions having perfluorinated alkyl chain lengths of six carbons or fewer in order to meet future environmental protection standards which, when formulated into coatings or surface treatments, provide hydrophobic and oleophobic surface properties equivalent to those produced hitherto using coatings containing longer perfuorinated alkyl chains.

SUMMARY OF THE INVENTION

An aim of the present invention is to provide a product with an optimum perfluorinated chain length of six or fewer carbons, that has the same or better water and oil repellent properties as materials with perfluorinated chain lengths of seven carbons or longer for use in the surface treatment of various surfaces and parts.

The present invention is based on the surprising finding that a combination of perfluorinated monomers having a perfluorinated chain length of six or fewer carbon atoms with perfluorinated monomers having a perfluorinated chain length of six or fewer carbon atoms which additionally contain a hydrophilic group shows a higher performance than either monomer taken independently. This combination surprisingly provides a synergistic effect which was not anticipated.

Accordingly, the present invention provides compositions comprising perfluorinated derivatives containing a hydrophilic group represented by the chemical Formula A (hereafter referred to as "compounds of Formula A") and perfluorinated derivatives represented by the chemical Formula B (hereafter referred to as "compounds of Formula B").

Specific examples of compounds of Formula A are indicated below with their corresponding semi-structural formulae.

Compound 1A
N-methyl-N-[(2-methylpropenoyl)ethyl]-3,3,4,4,5,5,6,6,7,7,8,8,8-tridecafluorooctylsulfonamide:

$CH_2=C(CH_3)C(=O)OCH_2CH_2N(CH_3)SO_2(CH_2)_2(CF_2)_6F$

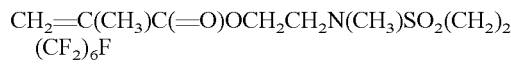

1A

Compound 2A
Propenoic acid 4,4,5,5,6,6,7,7,8,8,9,9,9-tridecafluoro-2-hydroxynonylester:

$CH_2=CHC(=O)OCH_2CH(OH)CH_2(CF_2)_6F$

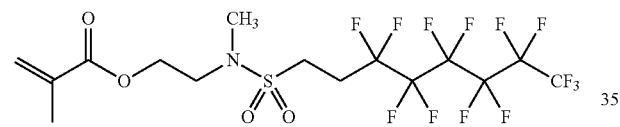

2A

Compound 3A
2-(2-Methylpropenoyl)ethyl-2-(poly[oxy(hexafluoropropene)])-tetrafluoropropanoate:

$CH_2=C(CH_3)C(=O)O(CH_2)_2OC(=O)CF(CF_3)(OCF_2CF(CF_3))_nF$

3A n = 3-4

Compound 4A
2-Methylpropenoic acid, 4,4,5,5,6,6,7,7,8,9,9,9-dodecafluoro-2-hydroxy-8-(trifluoromethyl)-nonyl ester:

$CH_2=C(CH_3)C(=O)OCH_2CH(OH)CH_2(CF_2)_4CF(CF_3)_2$

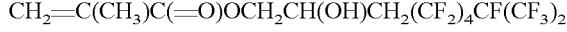

4A

Compound 5A
Propenoic acid, 3,3,4,4,5,5,6,6,7,7,8,8,8-tridecafluoro-1-(hydroxymethyl)octyl ester:

$CH_2=CHC(=O)OCH(CH_2OH)CH_2(CF_2)_6F$

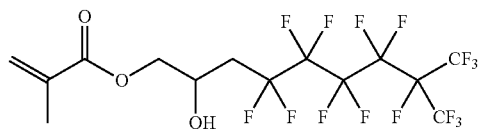

5A

Compound 6A
Propenoic acid, 4,4,5,5,6,6,7,7,7-nonafluoro-2-hydroxyheptyl ester:

CH2-CHC(=O)OCH2CH(OH)CH2(CF2)4F

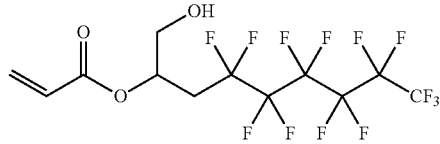

6A

Specific examples of compounds of Formula B are indicated below with their corresponding semi-structural formulae.

Compound 1B
2-Methylpropenoic acid, 3,3,4,4,5,5,6,6,7,7,8,8,8-tridecafluorooctyl ester:

$CH_2=C(CH_3)C(=O)O(CH_2)_2(CF_2)_6F$

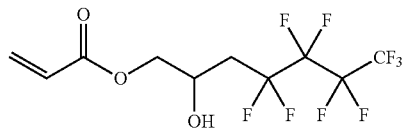

1B

Compound 2B
2-Propenoic acid, 3,3,4,4,5,5,6,6,7,7,8,8,8-tridecafluorooctyl ester:

$CH_2=CHC(=O)O(CH_2)_2(CF_2)_6F$

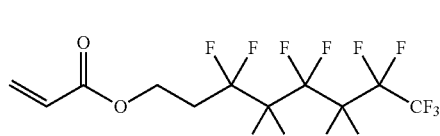

2B

DETAILED DESCRIPTION OF THE INVENTION

The present invention provides a composition comprising;

a. at least a first compound of Formula A

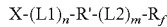

in which n is either 0 or 1;

m is either 0 or 1;

$R_f$ is a perfluorinated aliphatic structure, branched, linear or cyclic, in which no more than six fluorine bearing carbons are connected in any single straight chain segment, this structure optionally being interrupted by one or more oxygen atoms;

X is a moiety containing at least one group providing binding functionality to a surface to be treated, or containing at least one polymerisable double bond, or containing at least one cross-linkable group;

R' is a divalent radical containing at least one group capable of forming polar interactions or hydrogen bonds;

L1 and L2 are independently divalent linking radicals which do not form polar interactions or hydrogen bonds and b. a second compound of Formula B

in which p is either 0 or 1;

$R_f$ is a perfluorinated aliphatic structure, branched, linear or cyclic, in which no more than six fluorine bearing carbons are connected in any single straight chain segment, this structure optionally being interrupted by one or more oxygen atoms;

X is a moiety containing at least one group providing binding functionality to a surface to be treated, or containing at least one polymerisable double bond, or containing at least one cross-linkable group;

L3 is a divalent linking radical which does not form polar interactions or hydrogen bonds.

Compounds according to Formula A and Formula B contain perfluorinated linear or branched aliphatic or alicyclic groups represented as $R_f$, these having no more than six fluorinated carbon atoms connected to each other in a single, straight chain. The $R_f$ radicals preferably contain groupings of at least two, more preferably four and most preferably six contiguous fluorinated carbon atoms. The $R_f$ radicals preferably terminate in one or more trifluoromethyl groups.

The term "optionally interrupted by one or more oxygen atoms" in reference to the $R_f$ radical means that the carbon chain comprising the $R_f$ radical can be interrupted by one or more oxygen atoms, so long as the oxygen atoms are bonded only to carbon; that is, there are no oxygen-oxygen bonds. An example of a compound of formula A wherein $R_f$ is interrupted by one or more oxygen atoms is compound 3A.

X in Formula A and Formula B represents a group which provides a means to bind the molecule to a surface, or to form a polymer or cross-linked structure. Examples of suitable surface binding groups are carboxylate, phosphate, phosphonate, sulphonate, sulphate or trialkylsilane, trialkoxysilane, amine or trialkylammonium. Examples of suitable polymerisable groups are vinyl, allyl, vinyl ether, acrylate or methacrylate. Examples of suitable cross-linkable groups are epoxy, isocyanate, alcohol or amine. In preferred embodiments, X represents acrylate or methacrylate.

R' in Formula A represents a divalent radical containing at least one group capable of forming polar interactions or hydrogen bonds. Suitable examples may be based on linear or branched aliphatic, alicyclic or aromatic moieties bearing pendent polar groups such as hydroxyl, amine, ketone, thiol or carboxylate. Further examples wherein the divalent radical is interrupted by at least one heteroatom may contain groups such as ethers, thioethers, esters, ureas, urethanes, secondary or tertiary amines, sulphones, sulphonamides or amides. In a preferred embodiment, —R'— is —CH$_2$CH(OH)CH$_2$— and/or —CH2(CH2OH)CH$_2$—. In a further preferred embodiment, —R'— is —SO$_2$NR$^1$— wherein R$^1$ is hydrogen or a methyl group. In a further preferred embodiment, —R'— is an ester linkage.

L1 and L2 in Formula A and L3 in Formula B each represent independently divalent radicals which do not contain groups capable of forming polar or hydrogen bonds such as those present in R' as defined above. Suitable examples are linear or branched aliphatic chains, alicyclic or aromatic groups. In preferred embodiments, L1, L2 and L3 are linear aliphatic chains of twelve or fewer carbons. In a further preferred embodiment where R' is —NMeSO$_2$—, L1, L2 and L3 are each —CH$_2$CH$_2$—. In a more preferred embodiment where R' is —CH$_2$CH(OH)CH$_2$— and/or —CH$_2$(CH2OH)CH$_2$—, L1 and L2 are absent and L3 is —CH$_2$CH$_2$—.

In various embodiments, in addition to at least one compound of Formula A and at least one compound of Formula B, formulations of the present invention which are intended to undergo polymerization may comprise various diluent and/or cross-linking and/or reactive components such as are known in the art. Such components may be added to control the mechanical and elastic properties of the formulation, or to achieve improved wetting of and adhesion to a substrate to which the formulation is to be applied. Representative examples of diluent monomers include, but are not limited to butyl(meth)acrylate, hexyl(meth)acrylate, octyl(meth)acrylate, (decyl)methacrylate, dodecyl(meth-acrylate), longer chain alkyl(meth)acrylates, cyclohexyl (meth)acrylate and (meth)acrylate esters of other aromatic or aliphatic alcohols. Representative examples of cross-linking monomers include, but are not limited to di(meth)acrylates, tri(meth)acrylates, tetra(meth)acrylates and (meth)acrylate esters of higher polyols, cyanoacrylates, (meth)acrylic and vinyl functional silanes, (meth)acrylic and vinyl functional isocyanates. Representative examples of reactive components include, but are not limited to silanes and isocyanates, as well as compounds bearing other groups including hydroxyl, carboxylic, phosphonic, phosphoric or sulfonic acid, amine or ammonium functionalities.

Improvement in water repellency typically requires the fluorinated components to be present in the formulation at for example, at least about 5 wt. %, preferably at least about 10 wt. % and most preferably at least about 20 wt. % of the fluorinated components. To achieve a substantial improvement in oil repellency in addition to an improved level of water repellency, it is believed that the composition should comprise at least about 30 wt. %, preferably at least about 50 wt. % and most preferably at least about 75 wt. % of the fluorinated components.

In further embodiments, small amounts of other substances may also be included in formulations comprising at least one compound of Formula A and at least one compound of Formula B, to facilitate deposition and processing. Without limitation, these substances include activators, sensitizers, photoinitiators, wetting agents, film forming agents and the like. Dyes, pigments, fillers, UV stabilizers and antioxidants are among other materials that also may be included.

Formulations comprising at least one compound of Formula A and at least one compound of Formula B, or solutions, emulsions or dispersions derived from polymers comprising at least one compound of Formula A and at least one compound of Formula B may be applied to a substrate by any suitable process known in the art. Such processes include, but are not limited to coating or printing methods, such as for example, spray coating, flood coating, knife coating, doctor blade coating, Meyer bar coating, dip coating, gravure coating, flexographic printing, screen printing, gravure printing, atmospheric pressure plasma liquid deposition (APPLD), or plasma deposition techniques such as plasma assisted chemical vapour deposition (PCVD), radiation assisted chemical vapour deposition (RCVD) and/or mixtures thereof. Where porous substrates are employed, compositions comprising at least one compound of Formula A and at least one compound of Formula B may preferably be applied by processes including but not limited to APPLD, PCVD, RCVD and/or combinations thereof. These processes have the advantage of producing a thin, conformal coating on the substrate which substantially retains its initial porosity and the further advantage of not requiring the use of any solvents which have to be recycled or incinerated.

Plasma deposition techniques such as PCVD are widely used for the deposition of polymeric coatings, including water and oil repellent coatings, onto a range of surfaces. Using this method, plasmas are generated from small organic molecules, which are subjected to an ionising electrical field under low pressure conditions. When this is done in the presence of a substrate, the ions, radicals and excited molecules of the monomer in the plasma begin to polymerise in the gas phase and react with a growing polymer film on the substrate. U.S. Pat. No. 6,551,950 discloses use of plasma polymerisation to form an oil or water repellent surface using long chain hydrocarbons and fluorocarbons.

In the APPLD process, an aerosol of liquid precursor is directed into a homogeneous atmospheric pressure plasma where it is activated by the action of ionized process gas molecules on the aerosol droplet surfaces. The surface of a substrate that is also in contact with the plasma can similarly be activated by the action of ionized process gas molecules. When the activated aerosol droplets encounter the activated substrate surface, they can react to form a thin conformal layer of polymerised coating on the substrate. Representative examples of devices used to generate such a plasma discharge include those disclosed in WO2001/59809, WO2002/28548, WO2005/110626 and US2005/0178330.

In RCVD processes, a vapour of precursor molecules is generated in a heated vessel and is directed onto a cold substrate surface such that it condenses on the substrate surface to form a thin film which is subsequently polymerised by exposure to a suitable radiation source such as ultra-violet light or an electron beam having sufficient energy to initiate polymerization and/or grafting of the monomer onto the substrate surface. Representative examples of the RCVD process and its uses can be found in WO2011/037826 and U.S. Pat. No. 7,157,117.

Oil and/or water repellent coatings produced using formulations of the present invention may be of any thickness sufficient to achieve the required degree of repellency, but are preferably less 5 micrometers, more preferably 0.01 to 1 micrometer and most preferably 0.05 to 0.5 micrometer thick. If the coating becomes too thin, it may not completely cover asperities on the surface to be treated and it becomes difficult to achieve an adequate degree of repellency. If the coating is too thick, substrate physical properties such as porosity, gloss and color may be adversely impacted and coating costs will be increased. The present invention provides a process which achieves an optimal coating thickness.

Formulations comprising at least one compound of Formula A and at least one compound of Formula B, or solutions, dispersions or emulsions derived from polymers comprising at least one compound of Formula A and at least one compound of Formula B are preferably applied directly to the substrate which is to be rendered oil and/or water repellent. However, in another embodiment, the substrate may be first pre-treated by any means known in the art, to provide a surface which is more suitable for coating with a formulation of this invention. Suitable pre-treatments include, for example, plasma treatment, corona treatment, etching by plasma, solvent or aqueous etchants, coating of a primer layer and/or any combination of these pre-treatments. In the cases where a primer layer is applied to the substrate prior to coating with a formulation according to this invention, the primer layer may be applied by any coating method known in the art as described above. In preferred embodiments, a primer layer is applied by the RCVD or APPLD processes described above and a fluorinated composition of this invention is then applied by the same or a different process. The primer and the fluorinated composition of this invention may be applied on separate equipment. In an especially preferred embodiment, a primer and a fluorinated composition of this invention may be applied in a single pass through a device having two separate coating stations.

Suitable substrates for the application of the compositions according to the invention can be any self-supporting sheet, paper or film. Suitable films may be any film known in the film art, such as, for example, polyester, polypropylene, polyethylene, polycarbonate, cellulose triacetate and polyurethane films and microporous films and membranes. Suitable papers may be any paper know in the paper art, such as for example cellulose papers, cellulose/lignin papers, aramid papers and papers formed form blends of different types of pulp, fibrids and fibrils. Such papers may be formed into a cardboard structure. Suitable fabrics may be any fabric known in the fabric art, such as nonwoven, woven and knitted fabrics, grids, unidirectional-, bi-directional- or three-dimensional fabrics or combinations thereof. The substrate may also be a multi-layer structure combining two or more sheets such as for example SMS (spunbonded-meltblown-spunbonded) structures or laminates of microporous films with non-woven supports.

In various embodiments, the substrate may be a nonwoven or woven fabric comprising one or more natural or synthetic (man-made) fibers or filaments. The natural fibers or filaments of the nonwoven or woven fabric can be chosen among cellulose, cotton, wool, silk, sisal, linen, flax, jute, kenaf, hemp, coconut, wheat, and rice and/or mixtures thereof. The synthetic (man-made) fibers or filaments of the non-woven or woven fabric can be chosen among polyamides, polyaramides, polyesters, polyimides, polyolefins, polyacrylonitrile, polyglucan, rayon or other cellulose derived polymers and/or hybrids and mixtures thereof.

In a preferred embodiment, the substrate is a nonwoven fabric, examples of those fabrics are a polyethylene flashspun fabric, as commercially available, for example under the trade name Tyvek®, or a spun-bond polypropylene fabric, as commercially available under the trade name Typar®, both from E. I. du Pont de Nemours & Company (hereafter, DuPont) or a polypropylene-SMS material.

The following test method and materials were used in the Examples herein.

Test Method 1—Oil Repellency: Hydrocarbon Resistance Test

The oil repellency was measured using the AATCC Test Method 118-1992 of the American Association of Textile Chemists and Colorists. Drops of standard test liquids from a selected series of hydrocarbons having various surface tensions are placed on the fabric surface and observed for wetting, wicking, and contact angle. The AATCC oil repellency grade of the fabric is then given as the numerical value of the highest-numbered test liquid which will not wet the fabric within a period of 30+/−2 seconds. The composition of the test liquids is shown in the table below. A grade of zero (0) is assigned when the fabric fails with Kaydol test liquid. Kaydol is a mineral oil available at Sigma Aldrich under Cas#8042-47-5. Wetting of the fabric is normally evidenced by darkening of the liquid-fabric interface or wicking and/or loss of contact angle of the drop. A grade number of 5 or greater indicates good or excellent oil repellency. A grade number of 2 or less indicates poor oil repellency.

| AATCC oil repellency grade number | Composition | Surface tension (mN/m) |
|---|---|---|
| 0 | none (wetted by Kaydol) | |
| 1 | Kaydol | 31.5 |
| 2 | 65/35% Kaydol/n-hexadecane | 29.6 |
| 3 | n-hexadecane | 27.3 |
| 4 | n-tetradecane | 26.4 |
| 5 | n-dodecane | 24.7 |
| 6 | n-decane | 23.5 |
| 7 | n-octane | 21.4 |
| 8 | n-heptane | 14.8 |

Materials

The following compounds were used in the examples herein.

N-methyl-N-[(2-methylpropenoyl)ethyl]-3,3,4,4,5,5,6,6,7,7,8,8-tridecafluorooctylsulfonamide, available from DuPont as Forafac® 1051 and referred to herein as "compound 1A".

Propenoic acid, 4,4,5,5,6,6,7,7,8,8,9,9,9-tridecafluoro-2-hydroxy nonylester, available from Daikin Industries Ltd. as Daikin® R-1633 and referred to herein as "compound 2A".

2-(2-Methylprop-2-enoyl)ethyl-2-(poly[oxy(hexafluoropropene)])-tetrafluoropropanoate, available from Specific Polymers Inc. and referred to herein as "compound 3A".

2-Methylpropenoic acid, 4,4,5,5,6,6,7,7,8,9,9,9-dodecafluoro-2-hydroxy-8-(trifluoromethyl)-nonyl ester, available from Daikin Industries Ltd. as Daikin® R-3633 and referred to herein as "compound 4A"

2-Propenoic acid, 3,3,4,4,5,5,6,6,7,7,8,8-tridecafluoro-1-(hydroxymethyl)octyl ester, available from Daikin Industries Ltd. and referred to herein as "compound 5A"

Propenoic acid, 4,4,5,5,6,6,7,7,7-nonafluoro-2-hydroxyheptyl ester, available from Daikin Industries Ltd. as Daikin® R-1433 and referred to herein as "compound 6A".

2-Methylpropenoic acid, 3,3,4,4,5,5,6,6,7,7,8,8,8-tridecafluorooctyl ester, available from DuPont as Capstone® MA62 and referred to herein as "compound 1B".

2-Propenoic acid, 3,3,4,4,5,5,6,6,7,7,8,8,8-tridecafluorooctyl ester, available from DuPont as Capstone® AC62 and referred to herein as "compound 2B".

EXAMPLES

The invention is illustrated by the following non-limiting examples.

Comparative Example 1

Oil repellency was measured by Test Method 1 on plain Tyvek® 1560B flash-spun polyethylene nonwoven sheet which was given a rating of 0.

Comparative Example 2

A 30 cm wide roll of Tyvek® 1560B flash spun polyethylene non-woven sheet (60 g/sqm) was pre-coated with propoxylated neopentyldiacrylate (Sartomer® SR9003, available from Arkema) using the previously described APPLD technology at a web speed of 5 m/min and a monomer supply rate of 500 μl/min under a helium plasma of 5 kW to provide an acrylic primer coated flash spun polyethylene non-woven sheet. Oil repellency was measured by Test Method 1 and was given a rating of 0.

Comparative Examples 3 and 4

The acrylic primer coated Tyvek® 1560B flash spun polyethylene non-woven sheet obtained in Comparative Example 2 was further coated on top of the primer layer with Compound 2A to produce Comparative Example 3 or with Compound 1B to produce Comparative Example 4 using the previously described APPLD technology, except at a web speed of 2.5 m/min.

Examples 1 to 6

Weighed amounts of Compounds 2A and 1B were placed in 50 ml glass vials and stirred to produce five mixtures of Compounds 2A and 1B having different compositions as shown in Table 1. These where then separately coated onto the acrylic primed Tyvek® 1560B flash spun polyethylene non-woven sheet obtained in Comparative Example 2 on top of the primer layer using the previously described APPLD technology, except at a web speed of 2.5 m/min.

Oil repellency was evaluated on these examples by Test Method 1 and the results are summarised in Table 1 below.

TABLE 1

| Example | Compound 2A (Wt %) | Compound 1B (Wt %) | Oil Repellency |
|---|---|---|---|
| Comparative Example 1 | N/A | N/A | 0 |
| Comparative Example 2 | N/A | N/A | 0 |
| Comparative Example 3 | 100 | 0 | 4 |
| Example 1 | 80 | 20 | 4 |
| Example 2 | 60 | 40 | 6 |
| Example 3 | 50 | 50 | 6 |
| Example 4 | 40 | 60 | 6 |
| Example 5 | 33.3 | 66.6 | 6 |
| Example 6 | 20 | 80 | 5 |
| Comparative Example 4 | 0 | 100 | 1 |

Comparing the results obtained from the Tyvek® 1560B flash-spun non-woven substrate without an acrylic primer layer (Comparative Example 1) and with an acrylic primer layer (Comparative Example 2) confirms that the acrylic primer does not change the initially poor oil repellency of this fabric.

Applying a coating of Compound 1B (Comparative Example 4) on top of the primer gives only a slight improvement in oil repellency and a coating of Compound 2A (Comparative Example 3) gives a greater, but still modest improvement in oil repellency. Examples 1 to 6 demonstrate clearly that when Compound 1B (being a representative compound of Formula B) is added to Compound 2A (being a representative compound of Formula A) and the resulting mixtures are coated onto the acrylic primed Tyvek® 1560B, the resulting oil repellency ratings increase and then decrease as the proportion of Compound 1B is increased. This shows a synergistic effect whereby coatings obtained from blends of Compound 1B and 2A provide surfaces of higher repellency (or at worst equal repellency) than those obtained with either pure compound alone.

Comparative Example 5

The procedure of Comparative Examples 3 and 4 was followed, except that the coating was prepared using Compound 3A.

Example 7

The procedure of Examples 1-6 was followed, except that the coating was prepared using a 50:50 wt % mixture of Compounds 3A and 1B.

Example 8

The procedure of Examples 1-6 was followed, except that the coating was prepared using an 20:80 wt % mixture of Compounds 1A and 1B.

Example 9

The procedure of Examples 1-6 was followed, except that the coating was prepared using a 50:50 wt % mixture of Compounds 4A and 1B.

Comparative Example 6

The procedure of Comparative Examples 3 and 4 was followed, except that the coating was prepared using a 50:50 wt % mixture of Compounds 2A and 5A.

Example 10

The procedure of Examples 1-6 was followed, except that the coating was prepared using a 25:25:50 wt % mixture of Compounds 2A, 5A and 1B, respectively.

Example 10A

The procedure of Examples 1-6 was followed, except that the coating was prepared using a 50:50 wt % mixture of Compounds 6A and 1B, respectively.

The oil repellency results measured by Test Method 1 from the above examples are summarized in Table 2 below.

TABLE 2

| Example | Coating components (wt %) | | | | | | | Oil Repellency |
| --- | --- | --- | --- | --- | --- | --- | --- | --- |
| | 1A | 2A | 3A | 4A | 5A | 6A | 1B | |
| Comparative Example 3 | | 100 | | | | | | 4 |
| Comparative Example 4 | | | | | | | 100 | 1 |
| Comparative Example 5 | | | 100 | | | | | 3 |
| Comparative Example 6 | | 50 | | | 50 | | | 5 |
| Example 3 | | 50 | | | | | 50 | 6 |
| Example 7 | | | 50 | | | | 50 | 6 |
| Example 8 | 20 | | | | | | 80 | 5 |
| Example 9 | | | | 50 | | | 50 | 5 |
| Example 10 | | 25 | | | 25 | | 50 | 6 |
| Example 10A | | | | | | 50 | 50 | 5 |

These examples demonstrate the improved oil repellency obtained from coatings combining compounds of Formula A with a compound of Formula B for multiple compounds of Formula A having different structures and perfluorinated chain lengths. Note that it was not possible to produce comparative examples where the coating contained pure Compound 1A or 4A due to the high viscosity and/or melting point of these materials.

Comparative Examples 7-17 and Examples 11-17

In order to show that similar improvements in oil repellency are observed when compositions of the present invention are applied to a range of substrates, further non-limiting examples were generated as described below. The substrates used were obtained from DuPont and were as follows:

Sontara® spun-laced non-woven having a basis weight of 37 g/m², composed of a blend of cellulose and polyester fibers.

Nomex® MetalPro fabric having a basis weight of 260 g/m², woven from a blend of meta-aramid, para-aramid, viscose and wool fibers.

Kevlar® N636 calendered aramid paper having a thickness of 36 micrometers and a basis weight of 30.5 g/m², composed of para-aramid flocs and meta-aramid fibrids in a weight ratio of 72:28.

An electroblown and calendared nanofibre sheet of basis weight 39 g/m², composed of polyimide fibers of 0.7 micrometer average diameter.

The procedure of Examples 1-6 was employed, varying the coating recipe and substrate as detailed in the Table 3. In these cases, the substrates were coated directly with the fluorinated composition without the use of any primer or pretreatment. Oil repellency was measured by Test Method 1 and the results from these examples are detailed in Table 3 below.

TABLE 3

| Example | Substrate | Coating components (wt %) | | | Oil Repellency |
| --- | --- | --- | --- | --- | --- |
| | | 2A | 5A | 1B | |
| Comparative Example 7 | Sontara® | 100 | | | 5 |
| Comparative Example 8 | Sontara® | | | 100 | 4 |
| Example 11 | Sontara® | 50 | | 50 | 6 |

TABLE 3-continued

| Example | Substrate | Coating components (wt %) | | | Oil Repellency |
|---|---|---|---|---|---|
| | | 2A | 5A | 1B | |
| Comparative Example 9 | Sontara ® | 50 | 50 | | 5 |
| Example 12 | Sontara ® | 25 | 25 | 50 | 7 |
| Comparative Example 10 | Nomex ® MetalPro | 100 | | | 3 |
| Comparative Example 11 | Nomex ® MetalPro | 50 | 50 | | 3 |
| Comparative Example 12 | Nomex ® MetalPro | | | 100 | 2 |
| Example 13 | Nomex ® MetalPro | 50 | | 50 | 5 |
| Example 14 | Nomex ® MetalPro | 25 | 25 | 50 | 5 |
| Comparative Example 13 | Kevlar ® paper | 50 | 50 | | 6 |
| Comparative Example 14 | Kevlar ® paper | | | 100 | 5 |
| Example 15 | Kevlar ® paper | 25 | 25 | 50 | 8 |
| Comparative Example 15 | Nanofibre sheet | 100 | | | 4 |
| Comparative Example 16 | Nanofibre sheet | 50 | 50 | | 4 |
| Comparative Example 17 | Nanofibre sheet | | | 100 | 4 |
| Example 16 | Nanofibre sheet | 50 | | 50 | 7 |
| Example 17 | Nanofibre sheet | 25 | 25 | 50 | 7 |

The table shows that the substrate has an effect, however the synergistic effect of using a Type A and Type B mixture is preserved.

The invention claimed is:

1. A composition comprising;
a) at least a first compound of Formula A

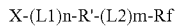

X-(L1)n-R'-(L2)m-Rf in which
n is either 0 or 1;
m is either 0 or 1;
Rf is a perfluorinated aliphatic structure, branched, linear or cyclic, in which no more than six fluorine bearing carbons are connected in any single straight chain segment, this structure optionally being interrupted by one or more oxygen atoms;
X being either:
  i) a moiety containing at least one group providing binding functionality to a surface to be treated, or containing at least one polymerisable double bond, or containing at least one cross-linkable group; or
  ii) an acrylate, a methacrylate, or a vinyl group;
R' being either:
  (i) a divalent radical containing at least one group capable of forming polar interactions or hydrogen bonds; or
  (ii) —(CH2)pCH(OH)(CH2)q—, —(CH2)pCH(CH2OH)(CH2)q—, —NR1SO2—, —C(O)NR2— or —C(O)O—,
    wherein p and q are independently integers from 1 to 4, and
    R1, R2 independently represent a hydrogen atom or an alkyl group that is linear or branched, having from one to four carbon atoms;
L1 and L2 are either:
  (i) independently divalent linking radicals which do not form polar interactions or hydrogen bonds, or
  (ii) independently divalent linear or branched alkyl chains of up to six carbon atoms,
and
b) a second compound of Formula B

X-(L3)p-Rf in which
p is either 0 or 1;
Rf is a perfluorinated aliphatic structure, branched, linear or cyclic, in which no more than six fluorine bearing carbons are connected in any single straight chain segment, this structure optionally being interrupted by one or more oxygen atoms;
X being either:
  i) a moiety containing at least one group providing binding functionality to a surface to be treated, or containing at least one polymerisable double bond, or containing at least one cross-linkable group; or
  ii) an acrylate, a methacrylate, or a vinyl group;
L3 is either:
  i) a divalent linking radical which does not form polar interactions or hydrogen bonds, or
  ii) a divalent linear or branched alkyl chain of up to six carbon atoms,
wherein Rf is C6F13—, (CF3)2CF(CF2)4— or F(CF(CF3)CF2O)nCF(CF3)— wherein n is 1 to 4.

2. A composition comprising;
a) at least a first compound of Formula A, and
b) a second compound of Formula B

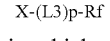

X-(L3)p-Rf in which
p is either 0 or 1;
Rf is a perfluorinated aliphatic structure, branched, linear or cyclic, in which no more than six fluorine bearing carbons are connected in any single straight chain segment, this structure optionally being interrupted by one or more oxygen atoms;
X being either:
  i) a moiety containing at least one group providing binding functionality to a surface to be treated, or containing at least one polymerisable double bond, or containing at least one cross-linkable group; or
  ii) an acrylate, a methacrylate, or a vinyl group;
L3 is either:
  i) a divalent linking radical which does not form polar interactions or hydrogen bonds, or
  ii) a divalent linear or branched alkyl chain of up to six carbon atoms,
wherein the compounds of Formula A are selected from the group consisting of:
a) N-methyl-N-[(2-methylpropenoyl) ethyl]-3,3,4,4,5,5,6,6,7,7,8,8,8-tridecafluorooctylsulfonamide;
b) N-methyl-N-[(propenoyl)ethyl]-3,3,4,4,5,5,6,6,7,7,8,8,8-tridecafluorooctylsulfonamide;
c) propenoic acid, 4,4,5,5,6,6,7,7,8,9,9,9-tridecafluoro-2-hydroxy nonylester;
d) 2-Methylpropenoic acid, 3,3,4,4,5,5,6,6,7,7,8,8,8-tridecafluoro-2-hydroxy nonylester;
e) 2-(2-methylpropenoy)ethyl-2-(poly[oxy(hexafluoropropene)])-tetrafluoropropanoate;
f) 2-(Propenoy)ethyl-2-(poly[oxy(hexafluoropropene)])-tetrafluoropropanoate;
g) 2-Methylpropenoic acid, 4,4,5,5,6,6,7,7,8,9,9,9-dodecafluoro-2-hydroxy-8-(trifluoromethyl)-nonyl ester;

h) Propenoic acid, 4,4,5,5,6,6,7,7,8,9,9,9-dodecafluoro-2-hydroxy-8-(trifluoromethyl)-nonyl ester;
i) 2-Methylpropenoic acid, 3,3,4,4,5,5,6,6,7,7,8,8-tridecafluoro-1-(hydroxymethyl)octyl ester and
j) Propenoic acid, 3,3,4,4,5,5,6,6,7,7,8,8-tridecafluoro-1-(hydroxymethyl)octyl ester.

3. A composition comprising;
a) at least a first compound of Formula A

X-(L1)n-R'-(L2)m-Rf in which n is either 0 or 1;

m is either 0 or 1;

Rf is a perfluorinated aliphatic structure, branched, linear or cyclic, in which no more than six fluorine bearing carbons are connected in any single straight chain segment, this structure optionally being interrupted by one or more oxygen atoms;

X being either:
  i) a moiety containing at least one group providing binding functionality to a surface to be treated, or containing at least one polymerisable double bond, or containing at least one cross-linkable group; or
  ii) an acrylate, a methacrylate, or a vinyl group;

R' being either:
  (i) a divalent radical containing at least one group capable of forming polar interactions or hydrogen bonds; or
  (ii) —(CH2)pCH(OH)(CH2)q—, —(CH2)pCH(CH2OH)(CH2)q—, —NR1SO2—, —C(O)NR2— or —C(O)O—, wherein p and q are independently integers from 1 to 4, and R1, R2 independently represent a hydrogen atom or an alkyl group that is linear or branched, having from one to four carbon atoms;

L1 and L2 are either:
  (i) independently divalent linking radicals which do not form polar interactions or hydrogen bonds, or
  (ii) independently divalent linear or branched alkyl chains of up to six carbon atoms,
and b) a second compound of Formula B wherein the compound of Formula B is selected from the group consisting of 2-methylpropenoic acid, 3,3,4,4,5,5,6,6,7,7,8,8,8-tridecafluorooctyl ester and propenoic acid, 3,3,4,4,5,5,6,6,7,7,8,8,8-tridecafluorooctyl ester.

4. The composition of any one of the preceding claims, wherein the first compound of Formula A and the second compound of Formula B are respectively in a mole ratio of between 80:20 and 20:80.

5. A substrate having a coating comprising a composition of any one of claims 1, 2, or 3, wherein the substrate comprises fibers selected from the group consisting of plexifilamentary high-density polyolefin; melt-spun polyolefin; melt-spun polyester; melt-blown polyolefin; melt-blown polyester; spun-laced blend of cellulose and polyester; a blend of meta-aramid, para-aramid, viscose and wool; a blend of para-aramid floc and meta-aramid fibrids; polyimide and combinations thereof.

* * * * *